No. 724,306. PATENTED MAR. 31, 1903.
J. C. MACNAMARA.
BOOKKEEPING.
APPLICATION FILED DEC. 11, 1901.
NO MODEL. 3 SHEETS—SHEET 1.

Fig. 1

DAY BOOK

| L.NO. | ITEM | | S | | ✓ |
|---|---|---|---|---|---|
| | *Mon. 31st March* | | | | |
| | Recd. from C. C. Dugan his Note at 60 days | | R.D | 127 50 | |
| | T. Crossley (partner) drew | | W.C | 25 00 | |
| | Gave cheque for office cash $25.00 | | | | |
| | Recd. from J. R. Hoyt (bankrupt) first and final installment of 50% | | C.D | 45 35 | |
| | ~~(illegible)~~ | | | | |
| | Paid Rent of store | | | 6 25 | |
| | Bought Stationery and Stamps | | F.C | 5 00 | |
| | Gave Joicey & Co. our Note at 60 days | | Cr.P | 289 62 | |
| | Cash Sales | | C.M | 347 94 | |
| | Petty Cash is over | | C.E | 03 | |
| | Deposited in bank $1349.21 | | | | |
| | Bought for Cash an office desk | | A.C | 46 00 | |
| | | | | 3602 35 | |

Fig. 2

WEEKLY SUMMARY

| MON. Mar 31 | TUES. | WED. | THURS. | FRI. | SAT. | S | TOTALS |
|---|---|---|---|---|---|---|---|
| 214 00 | | | | | | R.D | 214 00 |
| 25 00 | | | | | | W.C | 25 00 |
| 720 99 | | | | | | C.D | 720 99 |
| 45 35 | | | | | | X.D | 45 35 |
| 425 02 | | | | | | D.M | 425 02 |
| 1042 34 | | | | | | | 1042 34 |
| 5 75 | | | | | | | 5 75 |
| 280 25 | | | | | | | 280 25 |
| 2 75 | | | | | | | 2 75 |
| 46 00 | | | | | | | 46 00 |
| 56 | | | | | | | 56 |
| 156 75 | | | | | | | 156 75 |
| 289 62 | | | | | | | 289 62 |
| 347 94 | | | | | | | 347 94 |
| 03 | | | | | | | 03 |
| 3602 35 | | | | | | | 3602 35 |

WITNESSES:
E. E. Overholt
Jos. A. Ryan

INVENTOR
Joseph Christopher Macnamara
BY Munn & Co.
ATTORNEYS.

No. 724,306. PATENTED MAR. 31, 1903.
J. C. MACNAMARA.
BOOKKEEPING.
APPLICATION FILED DEC. 11, 1901.

NO MODEL. 3 SHEETS—SHEET 2.

Fig. 3.

No. 724,306. PATENTED MAR. 31, 1903.
J. C. MACNAMARA.
BOOKKEEPING.
APPLICATION FILED DEC. 11, 1901.
NO MODEL. 3 SHEETS—SHEET 3.

Fig. 4.

LEDGER SUMMARY

WITNESSES:
E. E. Overholt
Jos. A. Ryan

INVENTOR
Joseph Christopher Macnamara
BY Munn & Co.
ATTORNEYS.

UNITED STATES PATENT OFFICE.

JOSEPH CHRISTOPHER MACNAMARA, OF NEW YORK, N. Y.

BOOKKEEPING.

SPECIFICATION forming part of Letters Patent No. 724,306, dated March 31, 1903.

Application filed December 11, 1901. Serial No. 85,455. (No model.)

*To all whom it may concern:*

Be it known that I, JOSEPH CHRISTOPHER MACNAMARA, a British subject, residing at 307 East Seventy-ninth street, New York, in the county of New York and State of New York, have invented a new and useful Improvement in Bookkeeping, of which the following is a specification.

My invention relates to the art of keeping accounts by single or double entry; and the main objects of my improvement are to provide, first, internal proofs of the accuracy of the records without the necessity of having to take off trial balances, and, second, a means for obtaining results more expeditious and certain than that afforded by the method of double entry employed at present. These objects I attain by means of a summarized double-entry record, which while it serves as a check as to the accuracy of the accounts kept in detail by single entry provides at the same time a means for obtaining a balance-sheet and a statement of profits and losses more expeditious and certain than that afforded by any other method of double entry. For the purposes of this summarized double-entry record I use four forms, as illustrated in the accompanying drawings, in which—

Figure 1 represents the day-book, wherein in addition to the usual columns a column headed "S" is provided; Fig. 2, the weekly summary, a book in which the summaries of accounts are entered from day to day; Fig. 3, the weekly balance, a book or sheet on which the totals of the entries in weekly summary added horizontally are set down and balanced; and Fig. 4, the ledger summary, a book to which the debit and credit totals of the different accounts appearing on the weekly balance are transferred.

For the purposes of the summary I propose that the various accounts or classes of accounts be designated thus: sundry assets, "A;" bank or banks, "B;" cash, "C;" creditors, (accounts payable,) "Cr.;" debtors, (accounts receivable,) "D;" expense accounts, (commercial,) "E;" sundry expense accounts, (factory or working,) "F;" interest and discount accounts, "I;" sundry liabilities, "L;" merchandise, "M;" raw materials, (factory or working business,) "N;" output, (of factory, workshop, &c.,) "O;" bills payable, "P;" bills receivable, "R;" sundry ledger accounts, "S;" time or pay-roll, (factory or working business,) "T;" ventures or consignments, "V;" partnership, company, or corporation accounts, "W;" contingent accounts, (such as are closed by profit and loss accounts,) "X;" capital account, "Z."

Now every transaction connected with a manufacturing or commercial business may be placed in some two of the foregoing classes on the debit side of one and the credit side of the other. In rare instances it may appear on the debit and credit sides of the same class. In the column of day-book headed "S" I set down opposite the money value appertaining to each transaction the letters denoting the classes to which such transaction belongs, the debit class always coming first. When all the transactions for the day are recorded in the day-book, the total money value is placed at foot of the last money entry. Then the summary column "S" is filled in, as shown in Fig. 1, after which the money values of the different double accounts are collected and the totals entered in the column of weekly summary provided for that day, as shown in Fig. 2. As the total money value of the double accounts must agree with the total at foot of the last money entry for that day in the day-book, a safeguard against numerical errors is provided.

At the end of the week the money entries of the weekly summary are added horizontally and the totals entered in the column headed "T." As the sum-total of the horizontal totals must agree with the sum-total of the footings of the day-book for the week, the safeguard against numerical errors is maintained. If the quarter end on any week-day except Saturday, the summary is made out for the portion of the week ending on that day, as shown in Fig. 2, and another summary is made out for the remaining days of the week.

When the weekly summary is filled, the weekly balance is made out from it, as shown on Fig. 3. The weekly balance is so constructed, with the debit accounts "A," "B," "C," &c., appearing at the side and the credit accounts "a," "b," "c," &c., at top, that the same money entry is made to stand for both debit and credit, and the same total must be the sum-total of all the debit totals and of all the credit totals, respectively. Thus the safeguard against numerical errors is kept up. The weekly balance being made out, the debit and credit totals of the various accounts or classes of accounts thereon are compared with the totals of the different books or of such accounts or classes of accounts as may be kept in the detail ledger. If they agree, the absolute correctness of the accounts may be assumed and the ledger summary filled, as shown in Fig. 4. If they do not agree in any instance, then the discrepancy will be so localized, being on the debit or credit side of a particular account or class of accounts, that it will be far more easily and quickly traced than it could be by the present method of weekly, monthly, or quarterly trial balances, in which the sum-total of all the debit entries must agree with the sum-total of all the credit entries.

Each folio of the ledger summary suffices for the summaries for three months. In column "A" at each side of the folio are entered the numbers of the accounts, column "B" is for the names of the accounts, column "C" for the money entries on opening books or for those brought forward from the preceding quarter, columns "D" are for the money entries for each week or portion of a week throughout the quarter, column "T'" in top horizontal row is for the totals of the money entries on that page added horizontally. These totals are to be carried forward and included in the final total-column "T²" on right-hand page. The column headed "2 Days to 31st Mar." is intended for the odd days at end of a quarter in case there should be any. For instance, if the quarter begin on Thursday, the 1st day of January, the thirteenth column would be used for the week ending Saturday, 28th of March. So another column would be required for the odd days completing the quarter in the following week. Columns E and F are for balance and profit and loss accounts, respectively, and the space $\frac{T}{T}$ in the center of the folio is for the debit totals and credit totals of the money entries added vertically, which totals must always be the same. The balance and profit and loss columns are so arranged that they must be filled immediately at the end of the quarter, the result of which is that a balance account and a profit and loss account are disclosed automatically every three months, and the returns so obtained will be numerically correct in any case and substantially correct provided that all the transactions have been truly recorded in the day-book and that the summaries and weekly-balance sheets have been treated with reasonable care.

Detail ledgers can be so constructed that weekly totals of the accounts or classes of accounts therein will appear from week to week, and these totals if the books are correctly kept must agree with the totals of the corresponding classes on the weekly balance. Only such accounts require to be kept in the detail ledger as it may be considered necessary to have at hand in detail.

The following advantages, among others, would accrue from this system of accounting:

First. Time, labor, and materials would be saved. The making out of the summaries, even of a very extensive business, would not, I believe, occupy one person more than a few hours daily. Consequently as no journal, cash-book, or trial balances would be required, as only some of the entries in daybook would have to be posted into the detail ledger and these only by single entry, as the accounts in this book would never require to be balanced or closed except when completed in the ordinary course, and as twenty folios of the same book would suffice for the ledger summary for five years it is evident that a considerable saving of time, labor, and materials would be effected.

Second. Greater accuracy would be secured.

Third. Falsification of the accounts by manipulation of figures would be practically impossible, since any attempt at falsification would be bound to disclose itself within a week.

Fourth. A merchant or manufacturer by having a copy of the weekly balance sent to him would always have at hand the means of ascertaining the progress and condition of his business and could at any distance exercise considerable supervision over his accounts.

What I claim as my invention, and desire to secure by Letters Patent, is—

In a system of bookkeeping, a set of books consisting of a day-book having entry-pages ruled in sets of vertical columns with appropriate headings for ledger-numbers, items, and summaries; and a weekly summary having vertical columns with appropriate headings for names of days of the week, and summaries, and totals; and a weekly balance having vertical columns with appropriate headings for merchandise, debtors and creditors, bills payable and receivable, and interest; a ledger summary having vertical columns with headings for entries brought forward, for entries of each week in a quarter and for a portion of a week in a quarter, for totals of entries of a page, and for final totals of entries, and for balances and profit and loss, respectively, as shown and described.

In testimony whereof I have signed my name to this specification in the presence of two subscribing witnesses.

JOSEPH CHRISTOPHER MACNAMARA.

Witnesses:
GEORGE H. McFARLAND,
JOSEPH P. McLOONE.